June 28, 1932.  P. G. BILLHORN  1,865,079
GATE
Filed Feb. 9, 1932    3 Sheets-Sheet 2
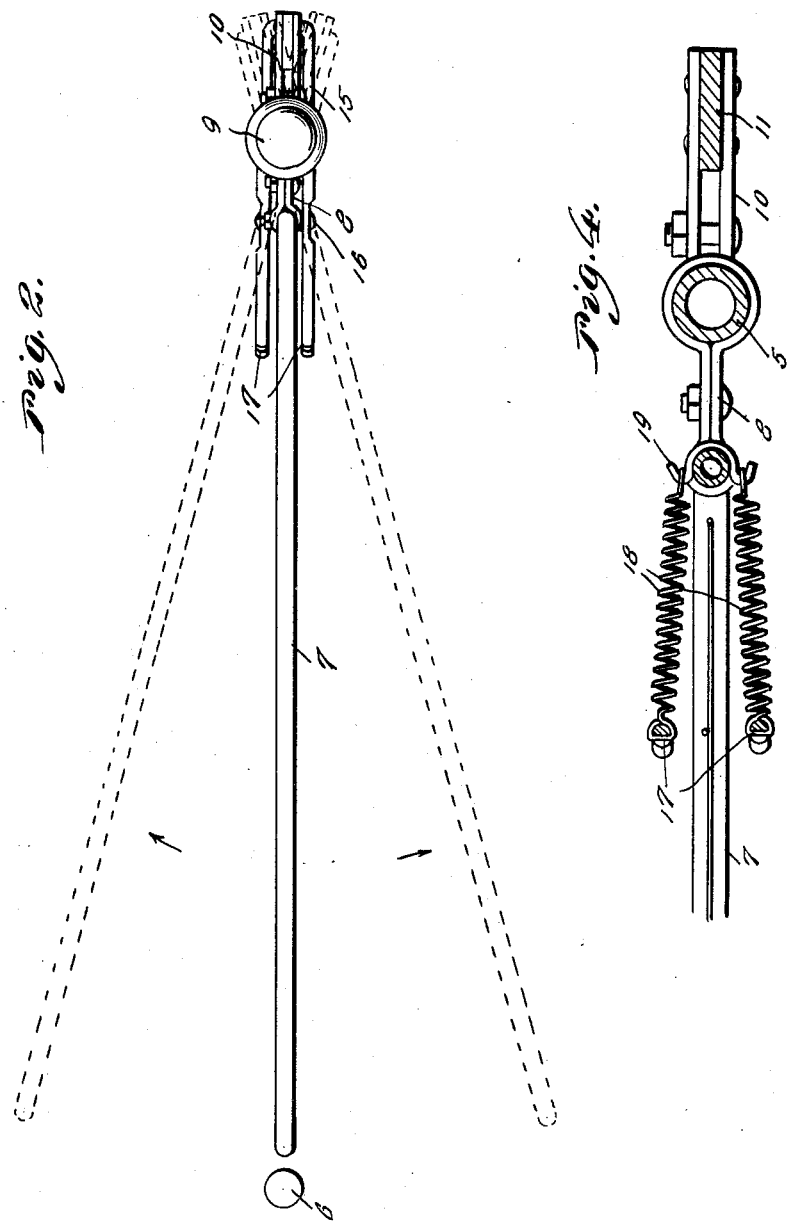
Inventor
P. G. Billhorn
By Clarence A. O'Brien
Attorney June 28, 1932. P. G. BILLHORN 1,865,079
GATE
Filed Feb. 9, 1932 3 Sheets-Sheet 3
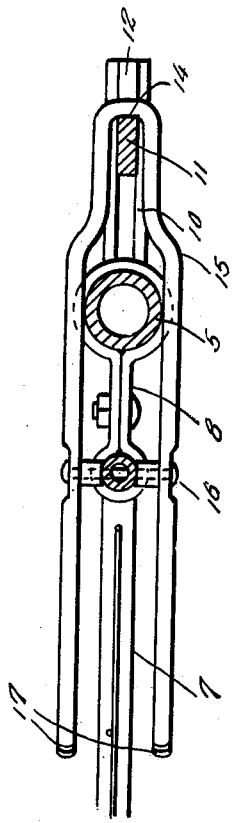
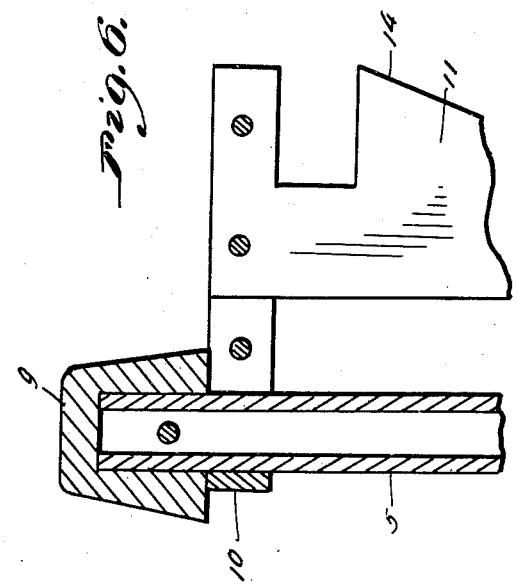
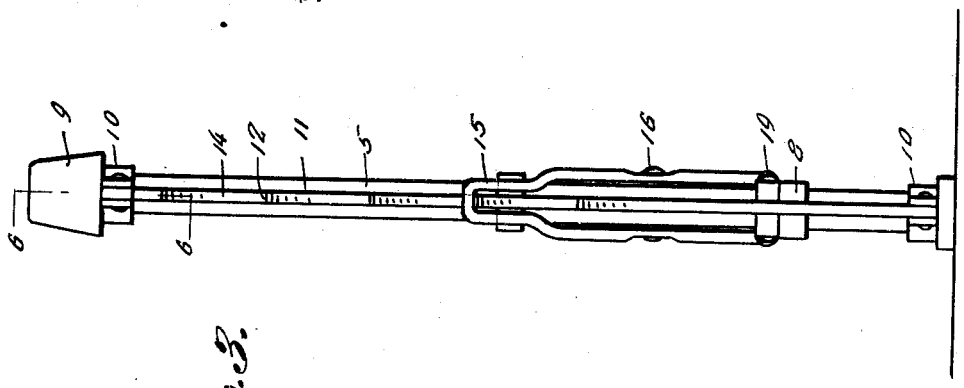
Inventor
*P. G. Billhorn*
By *Clarence A. O'Brien*
Attorney Patented June 28, 1932

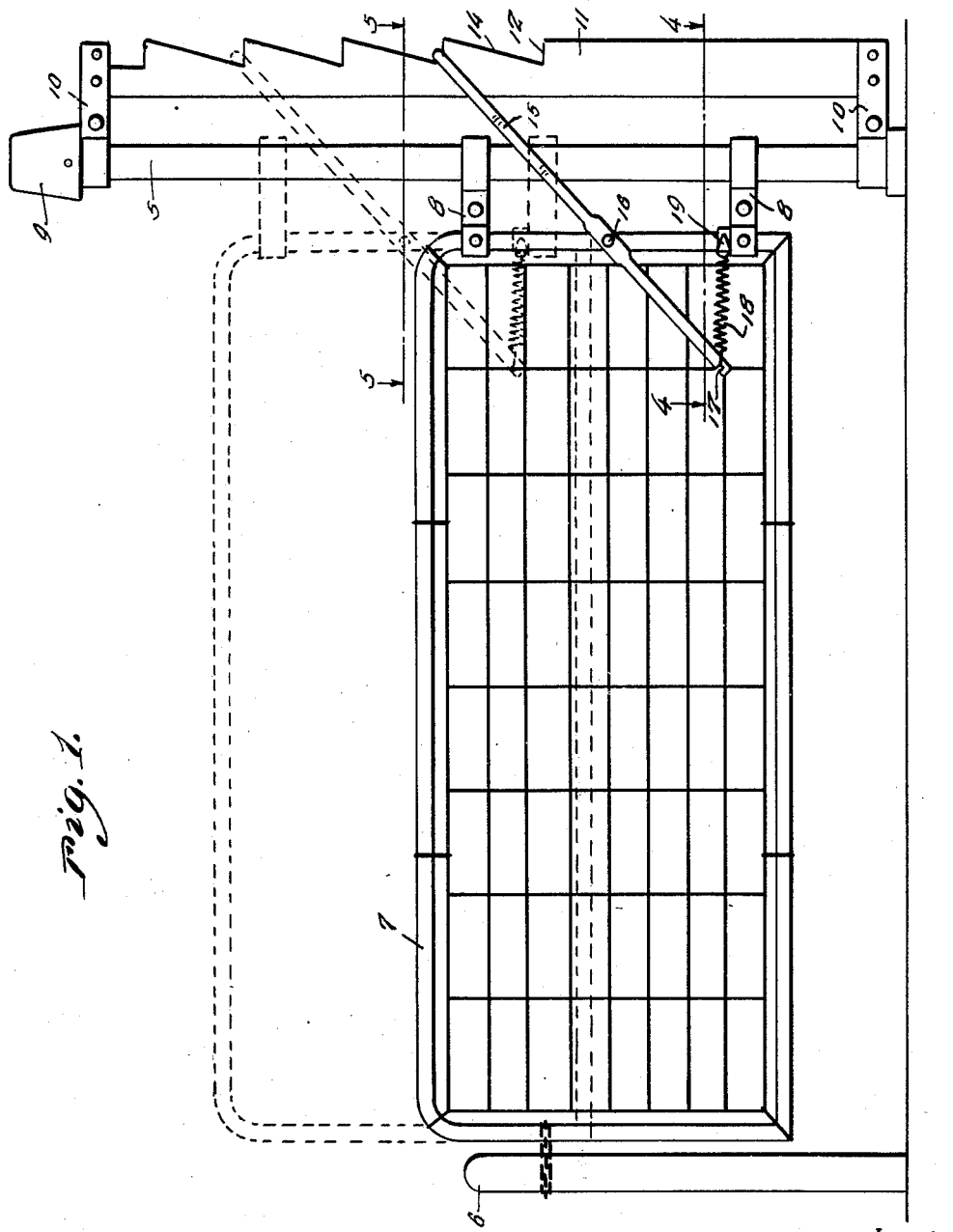

1,865,079

UNITED STATES PATENT OFFICE

PAUL G. BILLHORN, OF MANCHESTER, IOWA

GATE

Application filed February 9, 1932. Serial No. 591,874.

The present invention relates to a gate and the prime object thereof is to provide a gate associated with means whereby the gate may be swung to hang in operative positions at different elevations from the ground.

A still further very important object of the invention resides in the provision of a gate of this nature which may be manipulated in an easy and convenient manner to adjust the same to the desired height.

A still further very important object of the invention resides in the provision of a gate of this nature which is exceedingly simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a gate embodying the features of my invention.

Figure 2 is a top plan view thereof.

Figure 3 is an end elevation thereof.

Figure 4 is a horizontal section taken substantially on the line 4—4 of Figure 1.

Figure 5 is a horizontal section taken substantially on the line 5—5 of Figure 1, and Figure 6 is a detail vertical section taken substantially on the line 6—6 of Figure 3.

Referring to the drawings in detail it will be seen that numerals 5 and 6 denote gate posts. A gate 7 is hingedly mounted on the post 5 by means of straps 8 which are slidable and rockable on the post 5. The post 5 is higher than the post 6 and on the upper end thereof there is mounted a cap 9. Brackets 10 support a bar 11 on the post 5 in spaced parallelism therewith to the side of the post opposite the post 6. This bar 11 is provided with notches 12 of the ratchet type that is, having inclined surfaces 14 leading from the bottom of one notch to the top of the adjacent notch.

Numeral 15 denotes a U-shaped member straddling the bar 11, the post 5 and the adjacent portion of the gate 7 and being rockably mounted on the gate 7 on the end having the brackets 8 attached thereto as is indicated at 16. The extremities of the U-shaped member 15 are notched as is indicated at 17. Springs 18 are engaged in the notched end and engaged with a bracket 19 on the bottom of the end of the gate 7 adjacent the post 5. With the gate 7 in the full line position shown in Figure 1 it will be seen that the same may be lifted to the dotted line position of Figure 1 and the bight of the U-shaped member 15 will engage in the proper notch 12. To lower the gate from the dotted line position of Figure 1 it will be seen that the gate should first be lifted and then the member 15 rocked free of the notches and then the gate may be lowered and when at the proper elevation desired the U-shaped member 15 may be released and the springs 18 will swing the same to engage with the proper notch 12.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a gate, a stationary post, means for slidably swingably mounting the gate on the post and so that the gate may be slid vertically thereof, a bar parellel with said post and having notches, means for swingably mounting said bar on said post, and means on the gate to engage the notches to hold the gate at different elevations.

2. In combination, a gate, a stationary post, means for slidably and swingably mounting the gate on the post and so that the gate may be slid vertically thereof, a bar parallel with said post and having notches, means for swingably mounting said bar on said post, a U-shaped member having intermediate portions of its sides straddling the gate and rockable thereon and its bight portion engageable with the notches, and spring means normally holding the member so that the bight portion is in engagement with one of the notches.

In testimony whereof I affix my signature.

PAUL G. BILLHORN.